Dec. 25, 1934.  W. D. ARCHEA  1,985,225
MILLING MACHINE
Filed Aug. 24, 1925  5 Sheets—Sheet 1
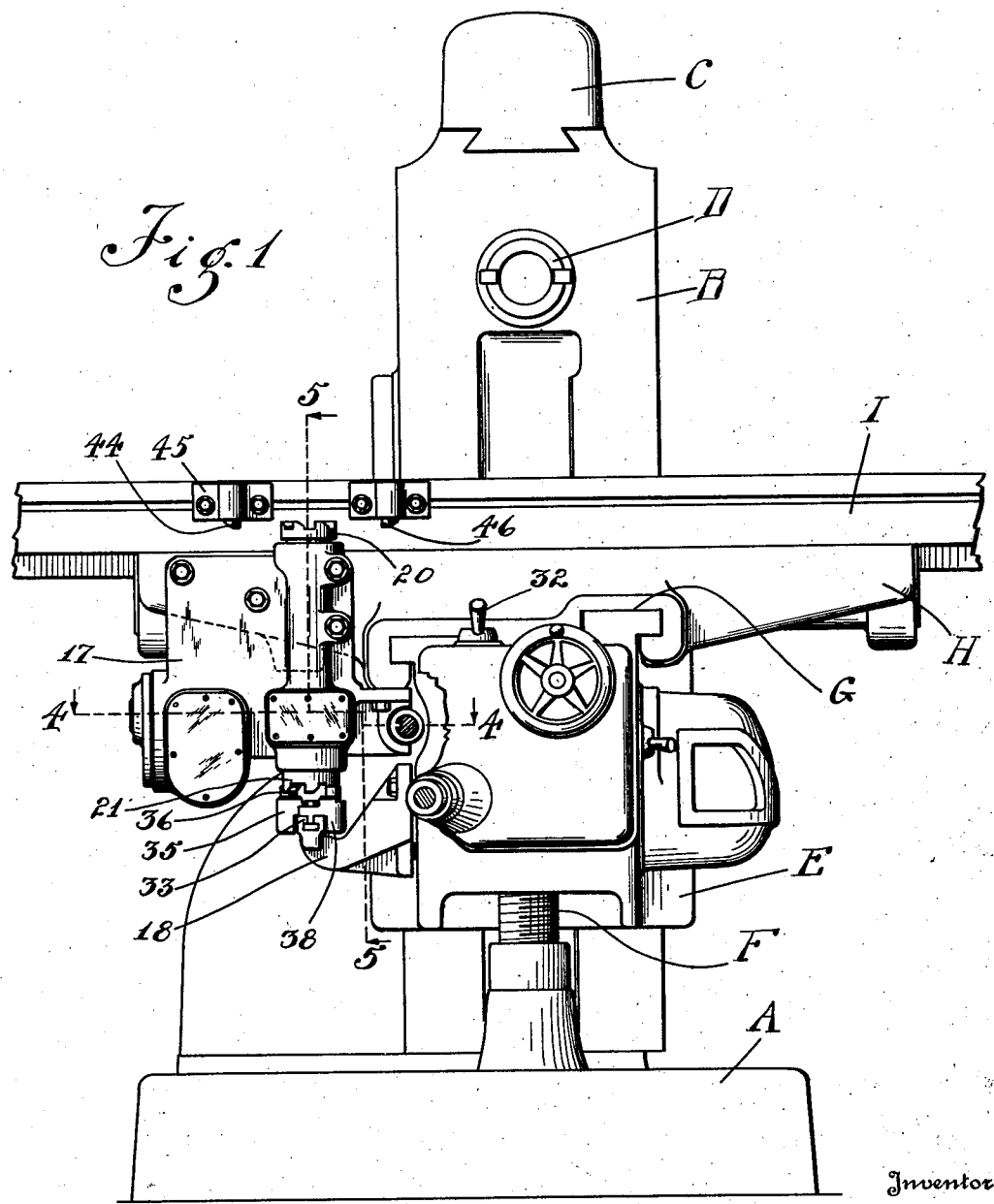

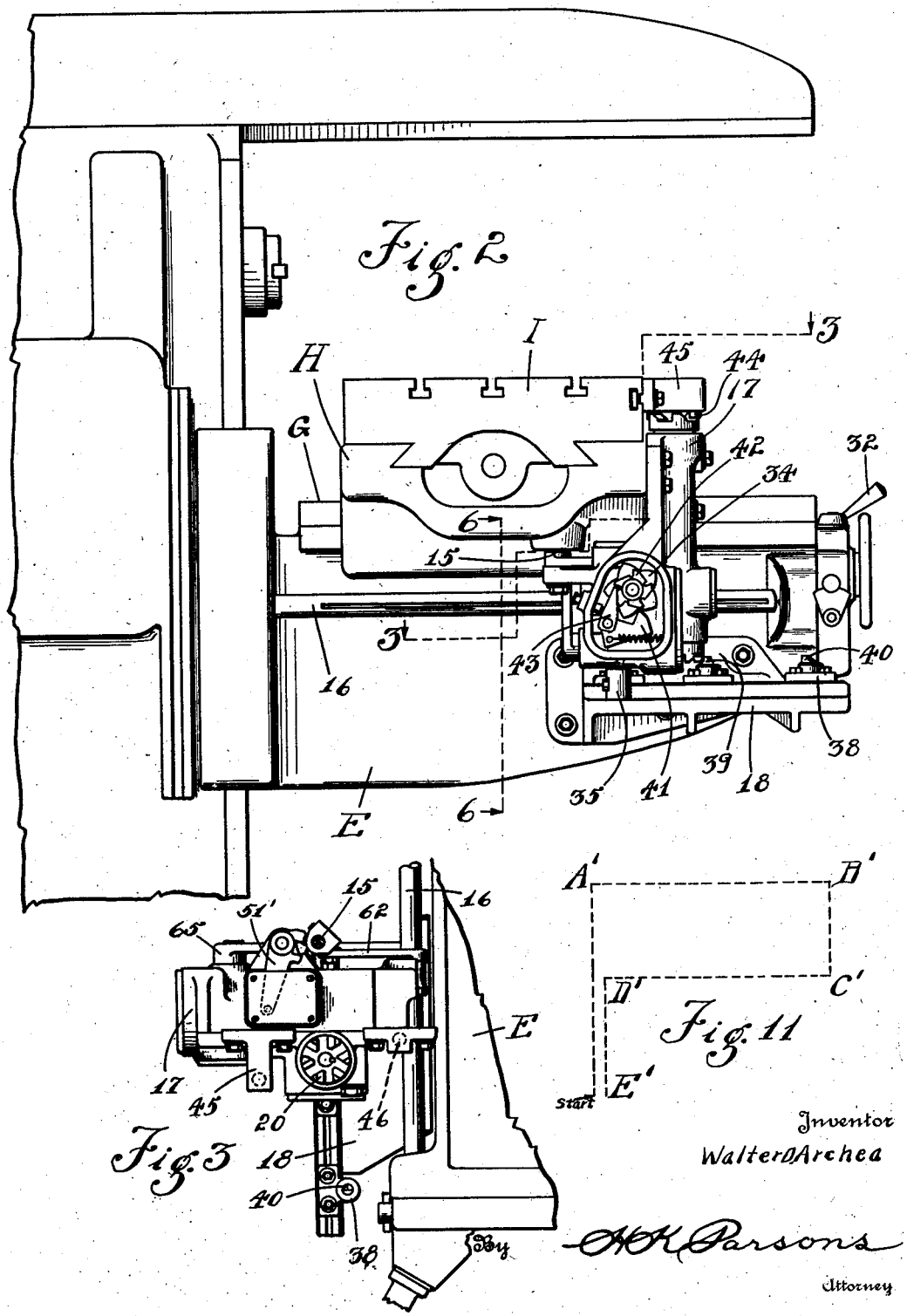

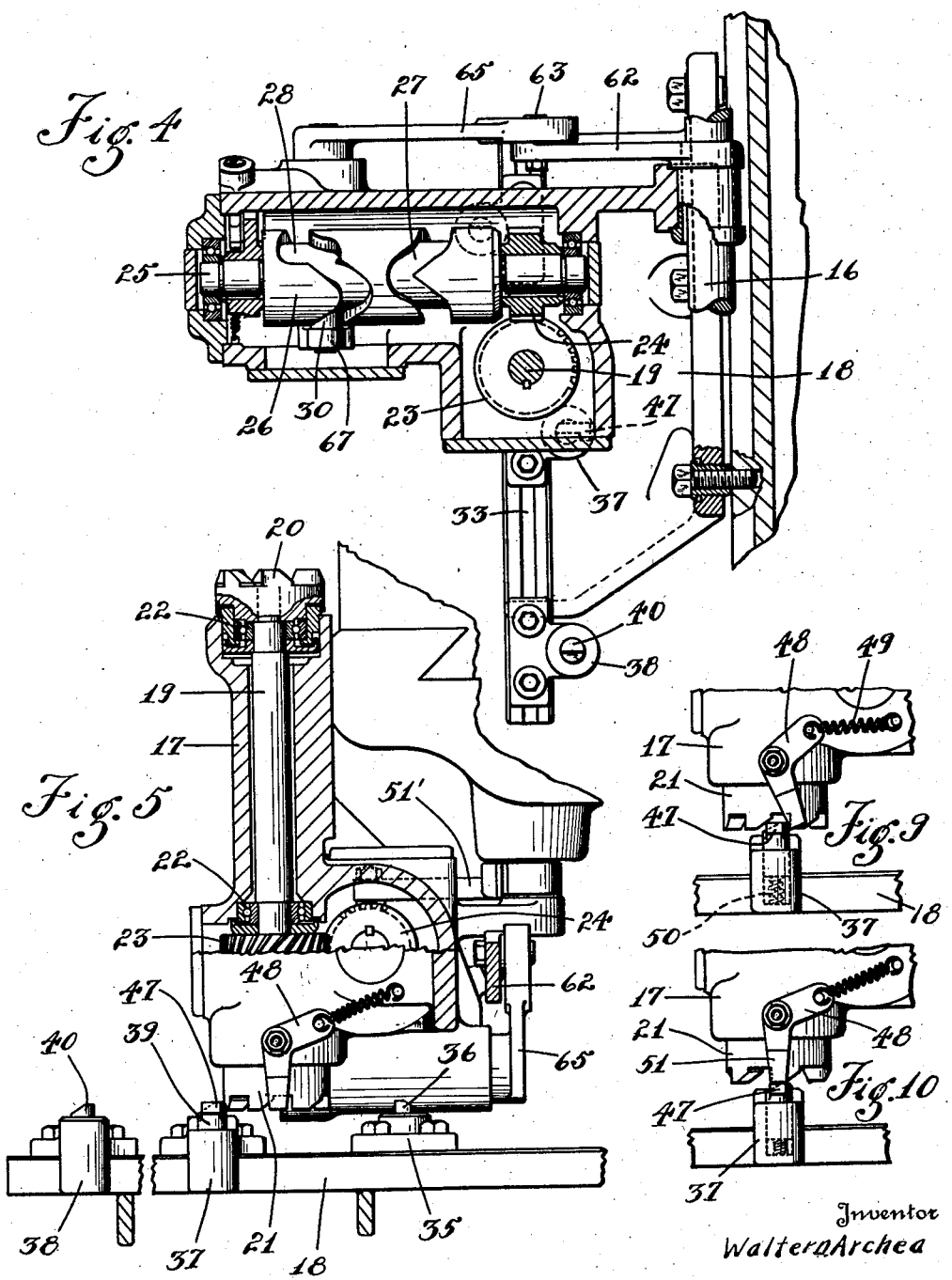

Dec. 25, 1934.  W. D. ARCHEA  1,985,225
MILLING MACHINE
Filed Aug. 24, 1925  5 Sheets-Sheet 4

Inventor
Walter D. Archea

By A. K. Parsons
Attorney

Dec. 25, 1934.  W. D. ARCHEA  1,985,225
MILLING MACHINE
Filed Aug. 24, 1925   5 Sheets-Sheet 5

Inventor
WALTER D. ARCHEA
By AHK Parsons
Attorney

Patented Dec. 25, 1934

1,985,225

UNITED STATES PATENT OFFICE 1,985,225

MILLING MACHINE

Walter D. Archea, Norwood, Ohio, assignor to The Cincinnati Milling Machine Company, Cincinnati, Ohio, a corporation of Ohio Application August 24, 1925, Serial No. 52,055

18 Claims. (Cl. 90—21)

This invention relates to improvements in machine tools and has particular reference to novel and improved mechanism for automatically effecting cyclic control of the operations thereof. The primary object of the present invention is the provision of novel and improved control mechanism for use in connection with machine tools such as milling machines having a plurality of relatively shiftable parts which will automatically control the directional shifting of the work together with the amplitude of shifting movement in any given direction.

A further object of the invention is the provision of a control mechanism of the general nature above mentioned which will cause the successive presentation of selected portions of a workpiece to a cutting tool and will bring the parts to a definite stop at the completion of the cutting operation.

Another object of the invention is the provision of a control device for cyclic milling operations or the like which may be satisfactorily applied to standard milling machine structures to automatically control the normal functions thereof.

Other objects and advantages of the present invention should be readily apparent by reference to the following specifications taken in connection with the accompanying drawings forming a part thereof, and it will be understood that any modifications in the specific structural details within the scope of the appended claims may be made without departing from or exceeding the spirit of the invention.

Figure 1 is a front elevation of a milling machine embodying these improvements.

Figure 2 is a fragmentary side elevation particularly illustrating the knee and associate parts with the cover plate and a portion of the control mechanism removed.

Figure 3 is a plan view of the control mechanism.

Figure 4 is a section on the line 4—4 of Figure 1.

Figure 5 is a section on the line 5—5 of said figure.

Figure 9 is a fragmentary view of the dog lockout mechanism in position for operation.

Figure 10 is a similar view showing the operation thereof,

Figure 11 is a diagrammatic view of the path or cycle of movement of the work produced by the cam and controls in the illustrated embodiment of the invention.

Figures 6, 7, 8:
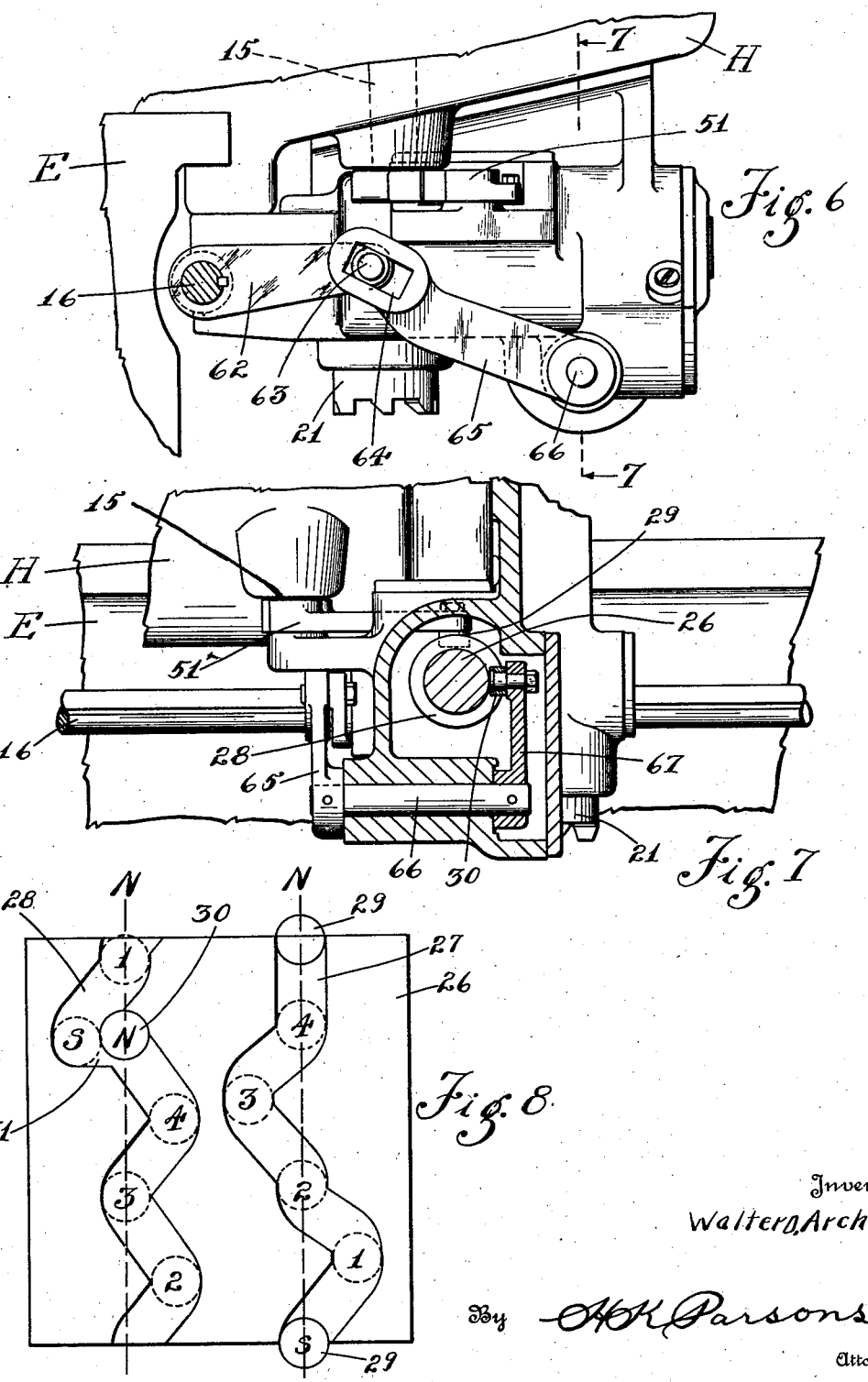
Figure 6 is an enlarged rear view of a portion of the control mechanism, the saddle control shaft being shown in section on the line 6—6 of Figure 2.
Figure 7 is a sectional view on line 7—7 of Figure 6.
Figure 8 is a diagrammatic view of the control cam expanded.

In the drawings there has been illustrated a conventional form of knee and column milling machine embodying the base "A" having the column "B" bearing overarm "C" and spindle "D" for attachment of the usual milling arbor. The machine has a knee portion "E" vertically movable on guides on the column by suitable power or manual actuation of adjusting screw "F". This knee is provided with the guides "G" supporting saddle "H" for movement toward and away from the column. Slidably supported on this saddle is the milling machine table "I" movable transversely of the machine.

These parts and the operating mechanism therefor are all of conventional construction. The machine is provided with the customary power mechanism for causing back and forth movements of the parts on their respective guides, and with controlling clutches which in an intermediate position disconnect the respective movers from the feed screws and which in opposite directions of movement cause power connection for moving the parts in opposite directions. Such driving mechanisms including reversing clutches or their equivalent are specifically shown and described in patents to Hazelton, Nos. 1,125,905 and 1,315,722 for example.

Figure 12:
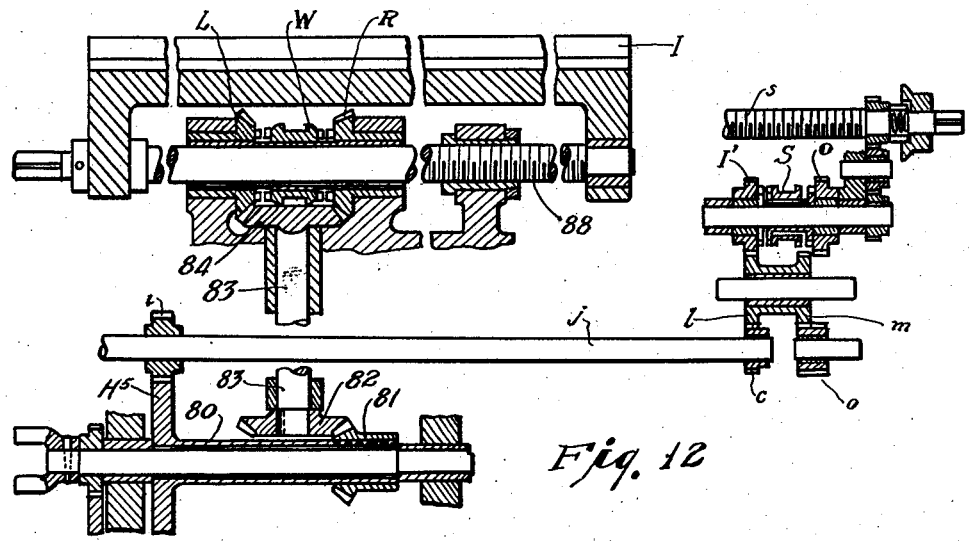
Figure 12 is a fragmentary expanded diagram of a standard milling machine gearing transmission controllable by the present invention.

As briefly reproduced in Figure 12, this drive mechanism may include the driven pinion 81 meshing with bevel gear 82 to drive shaft 83 bearing the bevel gear 84 and reversely driven pair of gears L and R with intermediate clutch W for coupling either gear to the feed screw 88 for table I. In addition power is transmitted through sleeve 80, gear $H^5$, pinion $i$ and transmission $j$, $c$, $l$, $m$, $o$ to oppositely driven gears I' and O having therebetween the selector clutch S for determining the direction of actuation of the saddle-shifting screw $s$.

Figure 14:
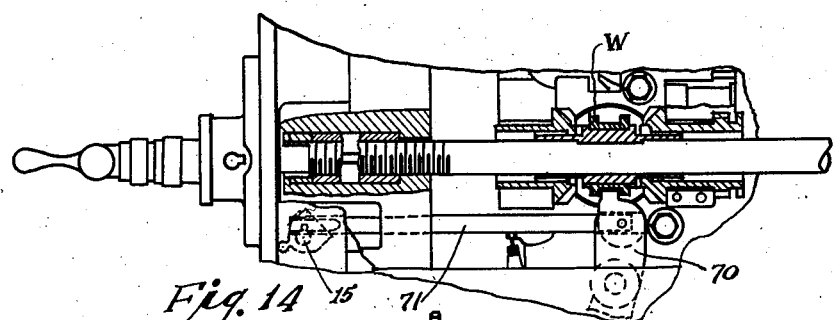
Figure 14 is a fragmentary plan, partly broken away and partly in section, of the table showing the transmission elements and the shifting clutch for causing it to travel to the right or left as influenced by the present improved control mechanism.
Figure 13:
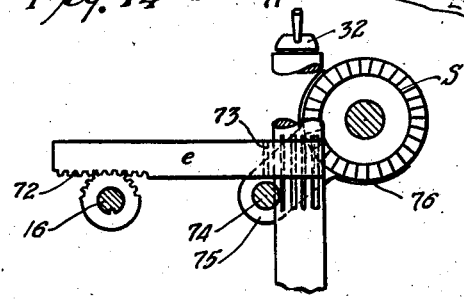
Figure 13 is a vertical section partly in elevation showing further details of the aforesaid conventional mechanism.

The prime points of these prior art structures to be noted in connection with the present invention are that the table clutch W is coupled with a spindle 15 by a shifter 70 and link or shifter rod 71. The clutch has a central neutral position and is shiftable in one direction, as for example, to the left, to cause the table to be moved to the left and is shiftable to the right to move the table to the right. Similarly the clutch S of the saddle-shifting mechanism is coupled with the spline shaft 16 so that the shaft in one position holds the clutch neutral and when rocked to the left causes the table to feed in toward the column or when rocked to the right causes outward movement of the table. The connection for this shifting may, for example, comprise the rod $e$ having a rack 72 meshing with a pinion on the shaft 16 and having a second rack portion as at 73 meshing with a double pinion serving to transmit motion to shaft 74 longitudinally shiftable in the knee and carrying an arm 75 terminating in a shoe 76 which rides in a groove of the clutch S so as to determine the position thereof. Conventional known clutch actuating members have been illustrated in Figures 13 and 14 respectively. The present invention relates not to the specific means by which the movements of the saddle and table in angularly related directions or meeting rectilinear paths are effected, but to the control mechanism for shifting of these two clutch-actuating members.

This control mechanism includes a bracket 17 secured to the saddle and movable therewith and a second bracket 18 carried by the knee. Journaled in bracket 17 is the automatic control spindle 19 having at its upper end the multiple tooth ratchet 20 and at its lower end a second ratchet 21. This spindle is supported in suitable anti-friction bearings 22 to facilitate free rotation thereof and has intermediately secured thereon gear 23 meshing with a second gear 24 on cam-shaft 25 which is also journaled in the general bracket member 17 as most clearly illustrated in Figure 4. Shaft 25 bears cam 26 shown in expanded form in Figure 8 and has the cam-grooves 27 and 28 respectively receiving the pins 29 and 30. It will be noted these two pins are spaced 90 degrees about the surface of the cam and this spacing must be taken into consideration in connection with consideration of the diagrammatic view bringing out the operation of the cam.

To facilitate a ready understanding of the operation of the cam a development of same expanded is shown in Figure 8, in which the neutral position in cam tracks 27 and 28 has in each instance been indicated by a vertical dotted line and the position of the two shift-yoke controlling pins at the completion of a cycle of operation of the machine has been shown in full lines. In addition the position of the shift-yoke controlling pins at each of the several steps in the intermittent rotation of the cam has been shown in dotted lines appropriately numbered in their consecutive order. Referring first to cam track 28 it will be noted that at the completion of a stroke the shift-yoke controlling member is in neutral position while the cam has a widened portion in its groove 31 into which the yoke pin may be laterally displaced by a manual shifting of the clutch in the usual manner through actuation of the conventional clutch control handle 32. This will cause an inward feed of the saddle carrying with it the table until the cam is given a rotative movement. When rotated 72 degrees or a fifth of a revolution the pin 30 will be moved into neutral position 1 while pin 29 will be laterally shifted to the right as shown at the point marked 1 in Figure 8. This will check inward movement of the saddle, which will come to a stop while the shifting to the right of pin 29 will cause a movement to the right of the table upon the saddle in the stroke A' to B' of Figure 11. At the proper time another one-fifth turn is given to the cam. This will cause pin 30 to shift from position 1 or neutral to position 2 causing a feeding in the reverse direction from that caused when it was shifted to position "S" for starting. This will produce an outward or forward movement of the saddle. Also the same amount of rotation of the cam shifts pin 29 to position 2 or neutral so that there is no motion of the table on the saddle. This is the stroke B'—C' of Figure 11. At a pre-determined point the cam is again given a one-fifth turn moving pin 30 from 2 to 3 or neutral and at the same time pin 29 will be shifted by the cam from its neutral position into position 3 at the left, causing the table to move on the saddle in the stroke C'—D'. At the completion of this stroke the cam is further rotated, moving pin 29 from 3 to 4 or neutral, stopping the movement of the table on the saddle while pin 30 is shifted from 3 to 4 again causing outward feed of the saddle in the stroke D'—E'. At the completion of this stroke the cam is given the final one-fifth turn completing its rotation. This action moves pin 30 from 4 to center line position "N" or neutral while on account of the straight portion of cam track 27 there is no lateral shifting of the pin 29. The result is that both feeds are checked and there is no further movement of the table or saddle until the hand-actuating lever is employed to laterally shift the saddle-controlling clutch, causing a new infeed stroke from starting point to point A' when the cycle of movements just described will be repeated.

The preceding description of the general method of operation of the mechanism has been presented at this point to facilitate a general understanding of the invention and in order that the purpose and function of the specific mechanism chosen in the present instance for purposes of illustration may be best understood. However, the foregoing is merely an example of one particular cycle of operations since it will be evident that to vary the cycles and sequence of movements of the saddle and table either singly or jointly in angularly related directions of movement in a non-retracing path it is merely necessary to provide a definite cam or cams in connection with properly located trips or controlling dogs.

Mention has previously been made of the fact that the cam shaft is coupled by gears with the ratchet-trip-shaft 19 and that this shaft has on its upper end the multiple tooth ratchet 20 and on its lower end the similar ratchet 21. As illustrated the table movement to right or left operates on member 20 and the cross feed of the saddle in or out operates on member 21 causing the rotation of cam member 26 which controls the operation of the table and cross feed. For attainment of this result bracket 18 has the T slot 33 in which are adjustably mounted trip dog supports 35, 37 and 38, which are disposed at opposite sides of the axis of rotation of trip shaft 19 and parallel with the line of movement thereof. To accomplish the cycle previously mentioned, trip dog support 35 has the yielding dog latch 36 adapted to engage ratchet 21 to cause rotation thereof as the saddle moves rearwardly but yieldable on account of its resilient mounting to permit a free sliding during movement of the saddle in a reverse or forward direction. On the contrary T slot 33 has a pair of trip dog brackets 37 and 38 adjustably secured thereon and having the dog latches 39 and 40 with inclined surfaces at one side so that ratchet 21 may depress the dogs without rotation on inward movement but will be positively engaged and given a rotative movement by the dogs as the saddle is moved outward.

By reference to Figure 11 it will be noted that the saddle has three distinct movements during the cycle, the first an inward movement from the starting point to A' where engagement of dog latch 36 with trip shaft ratchet 21 through gears 23 and 24 imparts a one-fifth turn to the cam shaft stopping this infeed motion. A star wheel 34 carried by the cam shaft and engaged by the spring-pressed pawl 41 aids in completing the rotative movement of the cam shaft to insure proper shifting of the gears to snap over the cam from one position to the next. At the same time ratchet 42 on the shaft is engaged by locking pawl 43 to prevent reverse turning of the cam shaft on account of friction between the trip shaft spindle ratchets and the dogs being depressed thereby.

The trip shaft having been given its first partial rotation by dog 36 the saddle movement is stopped and a movement of the table toward the right is initiated. This continues until dog 44 adjustably carried by bracket 45 on the front of the table engages ratchet 20 and gives a further partial turn to the trip shaft moving the cam to second position. This stops cross movement of the table and causes a reverse or outward movement of the saddle. This outward movement continues until ratchet 21 engages dog 30 shifting the cam to third position when the table will reverse until its second trip dog 46 again turns the trip shaft and control cam to fourth position. While in third position it will be understood that the ratchet on account of lack of movement of the saddle remains in engagement with dog 39. Consequently were this dog not in some manner moved out of engagement with the ratchet when the reverse feed is applied to the saddle it would cause additional rotation of the trip shaft and move the cam to a new position without appreciable change in position of the saddle. To prevent such action the dog is formed with a lateral lug or extension 47, while pivoted to the bracket 17 adjacent to ratchet 21 is bell-crank 48 having a lower arm urged into substantially vertical position by actuating spring 49. As dog 46 engages ratchet 20 the rotative motion of control spindle 19 is imparted to ratchet 21 which depresses plunger 39 allowing lower arm of bell-crank 48 to ride over lug 47 on plunger 39. When the saddle is in stationary position and the trip shaft is rotated by trip dog 46 on the table, the beveled faces of the rear of the ratchet teeth and of dog 39 co-act to force the dog downwardly against the upwardly urging pressure of spring 50 and permit lever arm 51 to swing downward into vertical position, engaging and holding depressed trip dog 39 as shown in Figure 10. This renders the dog inoperative so that the saddle may move outwardly from this dog toward the final trip dog 40 which gives the final cyclic rotation to ratchet 21 and thus to the control cam, moving the cam so that the two shifter yoke-controlling pins occupy the positions shown in the full lines in Figure 8 as previously described.

Specific description has been made of the novel mechanism attachable to an ordinary milling machine or the like for automatically controlling the cycles of operation thereof. By reference to the drawings it will be noted that the shift pin 29 is mounted on an arm 51' which is coupled as illustrated with the conventional spindle 15 of the milling machine. Oscillation of this spindle serves to impart back and forth movement to the customary table-controlling clutch to start, stop and reverse the movement of the table.

A different situation has to be taken in consideration in connection with the control of movement of the saddle since the drive mechanism for the saddle is contained in the supporting knee. The back and forth movement of the saddle makes it impossible to have fixed connection with the controlling clutch. To care for this situation the machine is provided with a spline shaft 16 extending from front to rear of the machine and at its forward end extending into the control box for operating the clutch-controlled starting, stopping and reversing of the table movement. Bracket 17 slidably supports rock-arm 62 keyed on the spline shaft and also rock-arm 65 which has a slot 64 engaging pin 63 on arm 62. Rock-shaft 66 connects arm 65 with the arm 67 which bears pin 30. As a result lateral movement of pin 30 is transmitted thru arm 67, shaft 66 and rock-arm 65 to pin 63 rocking arm 62 and thus spline shaft 16 to impart the necessary movements to the controlling clutch. This action will take place irrespective of the in and out movement of the saddle on the knee.

From the foregoing description taken in connection with the drawings, the construction of the improved automatic feed-trip mechanism which controls the cross and longitudinal movements of the machine should be readily understood. It will be noted that by the employment of this mechanism the work may be caused to perform any desired definite cycle of movement depending upon the particular configuration of the paths on the cam. As shown the table follows a rectangular path and returns to the starting position with the cutters clear of the work. All movements are fully automatic and are controlled by the special dogs on the machine, working in conjunction with the central automatic trip shaft. Consequently the only manual control required with a machine so equipped is the initial starting movement, the several cuts in desired path being performed in decided sequences and with minimum of lost motion or overrunning as might take place were manual controls depended upon, the work, therefore, requiring but minimum attention from the operator.

I claim:

1. A control device for application to a machine tool including a saddle and table related for joint or relative movement, comprising a bracket, dogs on said machine tool, a trip-shaft carried by the bracket having a dog-engaging ratchet, a control cam journaled in the bracket direction determining means for the saddle and table operatively connected to the cam, and means operatively associating the cam and trip-shaft for shifting the cam upon rotation of said shaft to thereby control the movements of the saddle and table.

2. The combination with a knee and column type milling machine, of a bracket for application to the saddle portion of the machine, a trip-shaft journaled in the bracket and having an upper ratchet for engagement with the table-dogs of the machine, a second lower ratchet on the shaft, and means on the knee adapted to engage said lower ratchet to actuate the trip-shaft upon relative movement of the saddle and knee portions of the machine.

3. The combination with a knee and column type milling machine having movable table and saddle portions and means for selectively moving said portions, of a control device therefor including a cam having portions for alternately operatively associating the table and the saddle with the driving means therefor and trip mechanism for actuating the cam to effect such cyclic movements.

4. A mechanism for automatically effecting cyclic movements of a milling machine table and saddle of the power-actuated type, in which the table and saddle are supported for independent relative movement including a rotary trip-shaft having a plurality of stations, control means associated therewith for effecting definite movements of the table and saddle at the different stations, and means on the machine for automatically indexing the trip-shaft from station to station.

5. A control mechanism for the shifting movements of a milling machine which comprises a saddle and table related for joint or relative movement including a cam having a plurality of stations, saddle and table movement actuating and reversing means associated with the cam, and trip-controlled means for shifting the cam from station to station to effect pre-determined cyclic movements of the table in angularly related directions.

6. A milling machine including a stationary support, a saddle mounted for in and out movement on the support, a table mounted on the saddle for movement at right angles to the direction of movement thereof, power means for actuating the saddle and table, and control mechanism for said power means including an operating cam and a trip-shaft having actuable portions adjacent the support and the table, the support and table being provided with trip dogs for cooperation therewith, whereby relative movement of the table and associate portion of the trip member or of the saddle with respect to the trip dogs on the support will cause inter-engagement of the dogs and trip member to vary the movement of the part bearing the dogs thus engaged.

7. A milling machine including a table, means supporting the table for shifting movement in angularly related directions, means for automatically, sequentially shifting the table in a predetermined series of directions, said means including a controlling cam, a trip-shaft coupled therewith, and adjustable dogs for actuating the trip shaft.

8. A control mechanism for a machine tool or the like having a work support and a fixed support, in which the work support is movable in two directions upon the fixed support, said control mechanism including a member movable with the table in one direction and with respect to which the table is movable in another direction, actuating means on the work support for engagement with said control mechanism to vary the amount of movement of the work support with respect to said mechanism, and additional means on the main support for engagement with the control mechanism to vary the amount of joint movement of said table and mechanism with respect to the main support.

9. The combination with a milling machine including a movable saddle and table whereby the position of the table may be varied in two directions in a plane, said machine including power driven reverser clutches, of a control mechanism for said clutches including a rotatable cam member having a portion for actuating the table reverser clutch and a second portion for actuating the saddle reverser clutch, and means for intermittently rotating the cam to engage and dis-engage said reverser clutches at pre-determined intervals whereby a desired cycle of movement is automatically imparted to the table.

10. An automatic control device for application to a milling machine having a table movement reverser and a saddle movement reverser, said mechanism including a bracket bearing a double control cam for actuating said reversers, a trip shaft for operating the cam, and independent members on the trip shaft engageable by table movement and by saddle movement to cause the cam to be shifted to operate the controlling members for said movements.

11. A mechanism of the character described including a cam shaft and an actuating trip-shaft coupled therewith, resilient means for supplementing the action of the trip-shaft in rotating the cam and additional means for locking the cam against accidental reverse rotation.

12. A device of the character described including a control cam for the table and saddle reversers of a knee and column milling machine, and a trip-shaft intermediately coupled therewith having a ratchet portion at one end for engagement by table dogs to actuate the cam and reverse the direction of movement of the table and having an additional ratchet portion adapted for engagement by means on the knee to rotate the cam and thus control the direction of movement of the saddle on the knee.

13. An automatic control attachment for a knee and column milling machine including a bracket for attachment to the knee having spaced dog-receiving portions extending parallel with the line of movement of the saddle on the knee and a control member for attachment to the saddle having a circular ratchet adapted to engage and be operated by certain of the dogs when moving in one direction and to ride idly over said dogs when moving in the opposite direction.

14. An automatic control device for a saddle type milling machine including a control bracket for application to the saddle of the machine, a face ratchet carried by the bracket adjacent the line of movement of the table on the saddle, yieldable dogs for attachment to the table to positively engage the ratchet on relative movement of the dogs and ratchet in one direction, and means for locking the ratchet against reverse rotation through frictional engagement with the dogs when the movement is in the opposite direction.

15. In a device of the character described the combination with a relatively movable ratchet and yieldable dog disposed in the path of the ratchet, of means on the ratchet for shifting the dog into in-operative position and means for temporarily locking the dog in such in-operative position.

16. A device of the character described including a rotatable control member having an actuating ratchet, dogs for engagement with opposite sides of the ratchet during relative movement of the parts, said dogs being operative in one direction and mounted for yielding movement without operation of the ratchet upon relative movement of the parts in the opposite direction, and means for locking the ratchet against rotation induced by frictional engagement of the dog and ratchet during such reverse movement.

17. A milling machine including a supporting member, a table mounted thereon for rectilinear movement in two angularly related directions, independent means for actuating the table in each of said directions, adjustable mechanisms for automatically limiting each directional movement of the table, and additional means operated by said limiting mechanisms for initiating movement of the table in a different angularly related direction.

18. A milling machine including a support, a table longitudinally and transversely movable on the support, power means for imparting said movements to the table, a controller coupled with the power means for controlling the several movements of the table thereby, said controller including a rotatable cam member having cam portions for producing a definite series of movements of the table in different angularly related directions, and adjustable trip members disposed to engage the controller on movement of the table and impart a step by step rotation to the cam thereof, whereby the extent of movement of the table in any direction during the cycle may be varied by adjustment of the corresponding trip member.

WALTER D. ARCHEA.